(12) United States Patent
Pursifull et al.

(10) Patent No.: US 8,061,329 B2
(45) Date of Patent: Nov. 22, 2011

(54) LIFT PUMP CONTROL FOR A TWO PUMP DIRECT INJECTION FUEL SYSTEM

(75) Inventors: Ross Dykstra Pursifull, Dearborn, MI (US); Joseph Norman Ulrey, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 440 days.

(21) Appl. No.: 11/934,341

(22) Filed: Nov. 2, 2007

(65) Prior Publication Data

US 2009/0114191 A1    May 7, 2009

(51) Int. Cl.
*F02M 57/02* (2006.01)
*F02M 63/00* (2006.01)

(52) U.S. Cl. .......................... 123/446; 123/447; 123/497

(58) Field of Classification Search .................. 701/104; 123/357, 446, 497, 447, 509–512, 179.16, 123/179.17; 310/68 R
See application file for complete search history.

(56) References Cited

U.S. PATENT DOCUMENTS

| | | | |
|---|---|---|---|
| 4,423,485 A * | 12/1983 | Sami et al. ..................... | 701/104 |
| 5,507,266 A | 4/1996 | Wright et al. | |
| 5,598,817 A | 2/1997 | Igarashi et al. | |
| 5,941,214 A | 8/1999 | Hoffmann et al. | |
| 6,065,436 A | 5/2000 | Koga et al. | |
| 6,067,966 A | 5/2000 | Saito et al. | |
| 6,230,688 B1 | 5/2001 | Faix et al. | |
| 6,257,204 B1 | 7/2001 | Kamijo et al. | |
| 6,739,317 B2 | 5/2004 | Kellner et al. | |
| 6,755,179 B2 * | 6/2004 | Asakawa ...................... | 123/436 |
| 7,207,319 B2 * | 4/2007 | Utsumi ......................... | 123/446 |
| 7,383,821 B2 * | 6/2008 | Gras et al. .................... | 123/509 |
| 7,503,313 B2 * | 3/2009 | Achleitner et al. ........... | 123/446 |
| 7,950,371 B2 * | 5/2011 | Cinpinski et al. ............. | 123/446 |
| 2005/0199219 A1 | 9/2005 | Utsumi | |
| 2007/0108856 A1 * | 5/2007 | Gras et al. .................... | 310/68 R |

FOREIGN PATENT DOCUMENTS

| | | |
|---|---|---|
| EP | 1847706 | 3/2007 |
| WO | 2006/032577 | 3/2006 |

OTHER PUBLICATIONS

ISA United Kingdom Intellectual Property Office Search Report of GB0819843.4, Feb. 25, 2009, UK.

* cited by examiner

*Primary Examiner* — Michael Cuff
*Assistant Examiner* — Keith Coleman
(74) *Attorney, Agent, or Firm* — Allan J. Lippa; Alleman Hall McCoy Russell & Tuttle LLP

(57) ABSTRACT

An economical method for controlling a lift pump operating as part of a direct injection fuel system is described. According to the method, at least two distinct operating modes are provided.

20 Claims, 5 Drawing Sheets

LIFT PUMP CONTROL FOR A TWO PUMP DIRECT INJECTION FUEL SYSTEM

FIELD

The present description relates to a method for controlling a lift pump operating as part of a direct injection fuel system.

BACKGROUND

It is common for direct fuel injected engines to have two fuel pumps. One example of a two pump direct injection fuel system is described in U.S. Pat. No. 6,230,688. This patent describes a fuel system wherein one fuel pump (i.e., the lift pump) lifts fuel from a fuel tank and delivers the fuel to a second fuel pump (i.e., the injection pump) at a first pressure. The second fuel pump increases the fuel pressure to a second pressure so that fuel can be directly injected into a cylinder. Current or voltage supplied to the lift pump is controlled in response to a pump speed sensor or in response to a pressure sensor.

The above-mentioned method can also have several disadvantages. In particular, the method requires a sensor to monitor the lift pump outlet pressure or the lift pump speed. This arrangement adds cost to the system and is therefore less desirable than a system that does not require sensors. In addition, the sensors may reduce system reliability as the system may not function as well if a sensor degrades.

The inventors herein have recognized the above-mentioned disadvantages and have developed a method that offers substantial improvements.

SUMMARY

One embodiment of the present description includes a method to operate a lower pressure pump operating as part of a direct injection fuel system, the method comprising: operating a lower pressure pump in a first mode during a first operating condition of an internal combustion engine, said lower pressure pump supplying fuel to a higher pressure pump that supplies fuel to fuel injectors that directly inject fuel to a cylinder, said first operating mode comprising adjusting energy supplied to said lower pressure pump as output from a sensor located downstream of said higher pressure pump varies while said higher pressure pump is substantially deactivated; and operating said lower pressure pump in a second mode during a second operating condition of said internal combustion engine, said second operating mode comprising varying energy supplied to said lower pressure pump as operating conditions of said internal combustion engine vary while said higher pressure pump is activated. This method overcomes at least some disadvantages of the above-mentioned method.

The expense and complexity of lift pump (i.e., lower pressure pump) control in a direct injection fuel system can be reduced while the capacity to regulate lift pump output is maintained. For example, lift pump outlet pressure can be controlled by using a pressure sensor that is located downstream of an injection pump (i.e., higher pressure pump), wherein the injection pump is located downstream from the lift pump. Specifically, when the injection pump is commanded off, pressure develops at the lift pump and advances down the fuel supply line and propagates through the injection pump. As a result, the fuel line and fuel rail located downstream from the injection pump are pressurized by the lift pump. A pressure sensor in the fuel rail can then be used to feedback fuel line pressure so that the lift pump can be controlled. In this way, the lift pump output pressure can be controlled without having to place an extra pressure sensor between the lift pump and the injection pump. Furthermore, the amount of energy supplied to the lift pump to achieve a particular fuel line pressure can be monitored and stored into memory for subsequent use.

In fuel delivery modes where the injection pump is activated, the current commands used to achieve a particular lift pump outlet pressure while the injection pump was off can be retrieved from memory and output so that the particular pressure is achieved. This allows the lift pump pressure to be controlled without a pressure transducer located at the lift pump outlet. In this mode, the injection pump can be controlled by the pressure sensor located downstream of the injector pump. Thus, a single pressure sensor located downstream of an injection pump can be used to control the outlet pressures of a lift pump and an injection pump.

The present description can provide several advantages. In particular, the approach controls fuel pressure from two fuel pumps connected in series using a single pressure transducer. Further, since only a single pressure transducer is used, system reliability can be improved because there is less probability that a sensor will degrade in the system.

The above advantages and other advantages, and features of the present description will be readily apparent from the following Detailed Description when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

Figure 1:
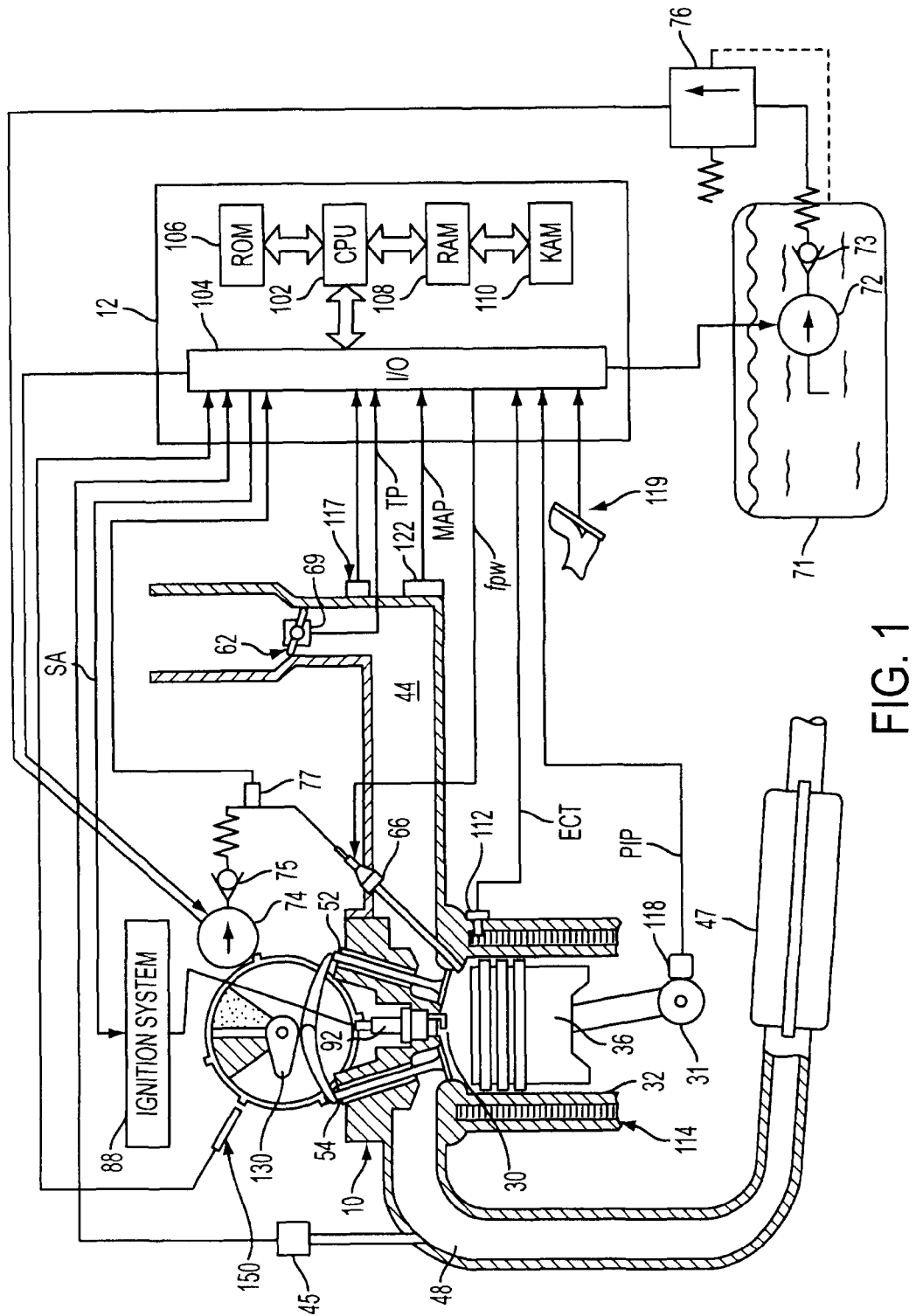
FIG. 1 is a schematic diagram of an engine, its fuel system, and its control system.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 31. Combustion chamber 30 is known communicating with intake manifold 44 and exhaust manifold 48 via respective intake valve 52 an exhaust valve 54. Each intake and exhaust valve is operated by a mechanically drive cam. Alternatively, intake valves and/or exhaust valves may be operated by electrically actuated valves.

Intake manifold 44 is shown communicating with optional electronic throttle 62. Fuel is injected directly into cylinder 30 by way of fuel injector 66. The amount of fuel delivered is proportional to the pulse width of signal FPW sent from controller 12. Fuel is delivered to fuel injector 66 by injection pump 74. Check valve 75 allows fuel flow from injection pump 74 to fuel injector 66 and limits flow from fuel injector 66 to injection pump 74. Lift pump 72 provides fuel from fuel tank 71 to injection pump 74. Check valve 73 allows fuel to flow from fuel pump 72 and limits fuel flow backwards into fuel pump 72. Pressure regulator 76 maintains a substantially constant (i.e., ±0.5 bar) fuel supply pressure to injection pump 74 when bypass flow is present. Alternatively, pressure regulator 76 may be eliminated from the system, if desired.

Note that the lift pump and/or injection pumps described above may be electrically, hydraulically, or mechanically driven without departing from the scope or breadth of the present description.

Distributor-less ignition system 88 provides ignition spark to combustion chamber 30 via spark plug 92 in response to controller 12. Universal Exhaust Gas Oxygen (UEGO) sensor 45 is shown coupled to exhaust manifold 48 upstream of catalytic converter 47. Converter 47 can include multiple catalyst bricks, in one example. In another example, multiple emission control devices, each with multiple bricks, can be used. Converter 47 can be a three-way type catalyst in one example.

Controller 12 is shown in FIG. 1 as a conventional microcomputer including: microprocessor unit 102, input/output ports 104, and read-only-memory 106, random-access-memory 108, 110 Keep-alive-memory, and a conventional data bus. Controller 12 is shown receiving various signals from sensors coupled to engine 10, in addition to those signals previously discussed, including: engine coolant temperature (ECT) from temperature sensor 112 coupled to water jacket 114; a position sensor 119 coupled to a accelerator pedal; a measurement of engine manifold pressure (MAP) from pressure sensor 122 coupled to intake manifold 44; a fuel rail pressure sensor 77; a throttle position sensor 69; a measurement (ACT) of engine air amount temperature or manifold temperature from temperature sensor 117; a engine position sensor from a Hall effect sensor 118 sensing crankshaft 31 position; and power driver circuitry capable of providing actuating energy to actuate valves as well as capability to provide current for heating valve actuators. In one aspect of the present description, engine position sensor 118 produces a predetermined number of equally spaced pulses every revolution of the crankshaft from which engine speed (RPM) can be determined.

Controller 12 storage medium read-only memory 106 can be programmed with computer readable data representing instructions executable by processor 102 for performing the methods described below as well as other variants that are anticipated but not specifically listed.

Figure 2:
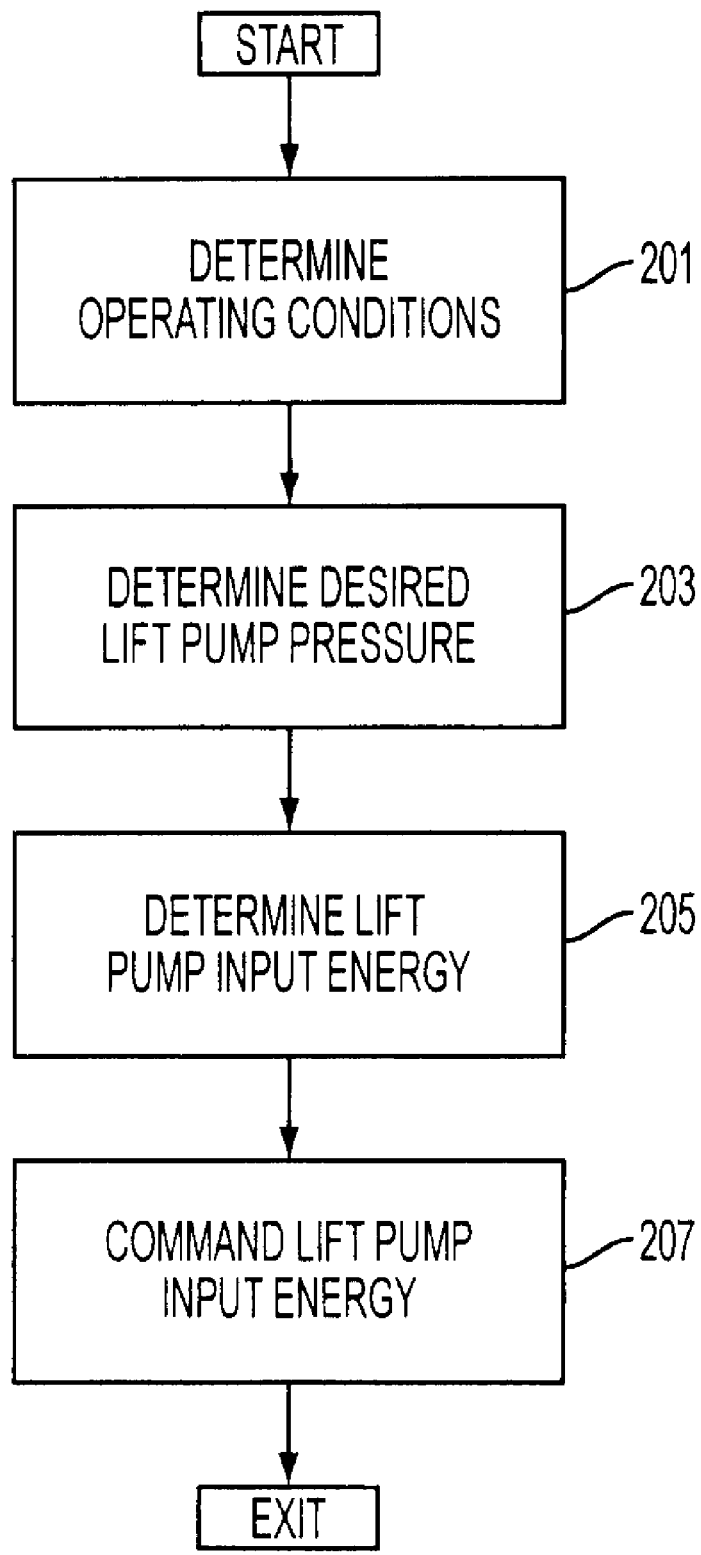
FIG. 2 is a flowchart of an example open-loop lift pump control method.

Referring now to FIG. 2, a flow chart of an example open-loop lift pump control method is shown. The method of FIG. 2 allows a lift pump that feeds an injection pump to be operated without a pressure regulator located between the lift pump and the injection pump. The absence of a pressure regulator can save system cost and can allow the lift pump to be operated during an engine start at higher pressures. Typically, pressure regulators are set to regulate at a pressure that is lower than the maximum pump pressure. When the pressure regulator is removed from the system, the lift pump can be operated at a higher pressure so that fuel injectors may be charged with higher pressure fuel while the engine is not rotating and while the injection pump is inactive. This can improve engine starting and lower engine emissions.

In step 201, operating conditions are determined. In one embodiment, controller 12 determines engine fuel flow rate, ambient air temperature, and lift pump temperature. In one embodiment, engine fuel flow rate can be determined from sensing fuel rail pressure and injection timing. Then, these parameters can be used to look up fuel flow using injector characterizations. In an alternative embodiment, fuel flow can be determined from the engine air flow and the desired air-fuel ratio. Lift pump temperature can be inferred from lift motor winding resistance based on applied voltage and measured current. The lift pump temperature estimate may also be based on ambient temperature since it is close to tank temperature and the lift pump is immersed in the tank. The routine proceeds to step 203 after operating conditions are determined.

Figure 5:
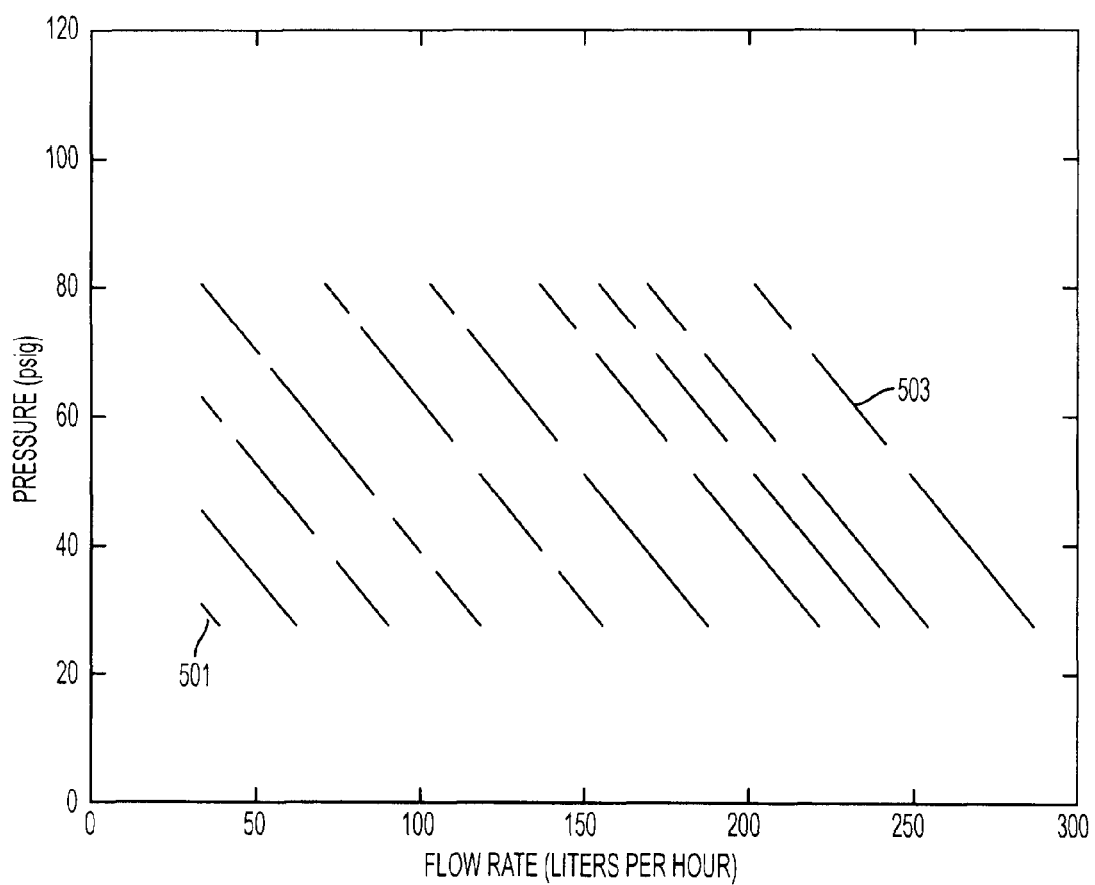
FIG. 5 is a plot of an example fuel pump performance map.

In step 203, the desired lift pump output pressure is determined. Lift pump performance can be empirically determined and mapped as shown in FIG. 5. A desired lift pump pressure can be achieved by operating the lift pump at different voltages, knowing the injector fuel flow rate. However, lift pump power consumption can be reduced by selecting a lower output pressure at which the injection pump can still achieve the target fuel rail pressure.

In one embodiment, lift pump performance is stored in table or function format in memory. The desired lift pump pressure can be retrieved from memory based on operating conditions. Once the lift pump output pressure is determined the routine proceeds to step 205.

In step 205, the desired lift pump energy is determined. Energy may be regulated to the lift pump in an electrical form (e.g., voltage, current, duty cycle) or in an alternate form such as speed, displacement, mechanical energy, or hydraulic energy. In one example, voltage can be applied at a frequency and duty cycle so that the lift pump is supplied an average voltage.

A voltage (that will operate the lift pump at a pressure determined in step 203, given the flow rate computed in step 201) is selected from an empirically determined pump flow map that is similar to the one illustrated in FIG. 5. The operating voltage is selected from the lower half of the range of voltages that will operate the lift pump at the desired lift pump pressure. In one example, the lowest voltage that will operate the pump at the desired lift pump pressure is selected to reduce pump energy consumption. The routine proceeds to step 207.

In step 207, the lift pump energy is output to the lift pump. In one embodiment, battery voltage is controlled by output from engine control module 12. The control module closes a switch that delivers battery voltage to the lift pump at a predetermined frequency. The duty cycle can then be modified to change the average voltage supplied to the lift pump. The routine exits after adjusting the lift pump energy.

Figure 3:
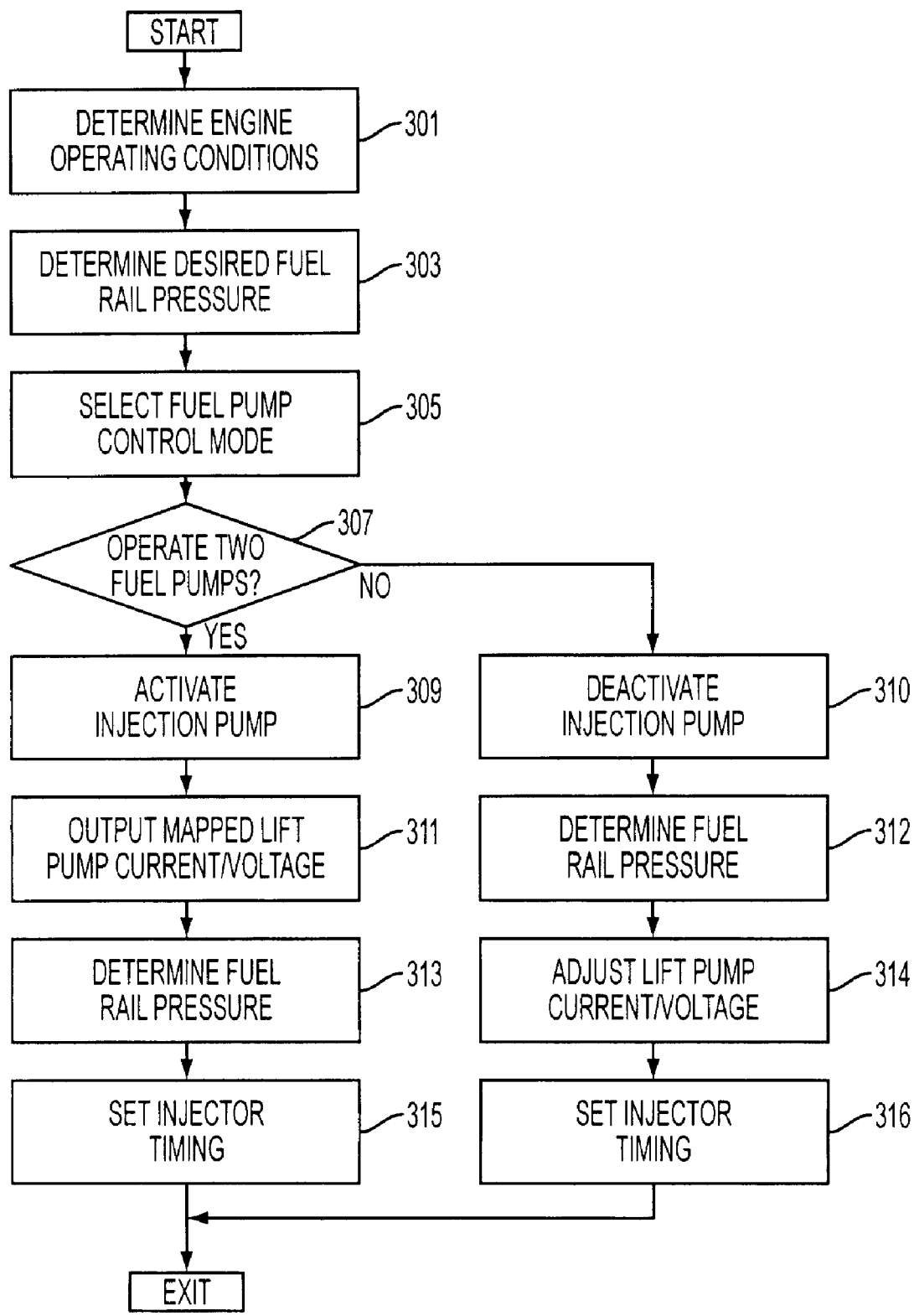
FIG. 3 is a flowchart of an example lift pump mode control method.

Referring now to FIG. 3, a flow chart of an example lift pump control method is shown. The method of FIG. 3 may be applied whether or not a pressure regulator is installed between a lift pump and an injection pump. If a pressure regulator is omitted, the method of FIG. 2 can be used to operate the lift pump in open-loop mode.

In step 301, the routine determines operating conditions. Operating conditions may include but are not limited to the following: engine load (i.e., the amount of air inducted by the engine relative to the theoretical amount of air the engine is capable of inducting), engine speed, engine temperature, injection timing, spark timing, driver torque demand, ambient air temperature, crankshaft position, camshaft position (valve timing), and throttle position. After engine operating conditions are determined the routine proceeds to step 303.

In step 303 the routine determines the desired fuel rail pressure. Operating conditions determined in step 301 are used to determine desired fuel rail pressure. In one embodiment, engine speed and load are used to index tables that have empirically determined values that describe a desired fuel rail pressure. These values may be further modified based on one or more of the following: injection timing, ambient air temperature, engine temperature, and valve timing. After the desired fuel rail pressure is determined, the routine proceeds to step 305.

In step 305, the fuel pump operating mode is selected. Typically, injection pumps are mechanically driven pumps that can produce noise and vibration as they pump fuel. This type of pump is often fitted with a valve that modulates (i.e., a fuel modulation valve) the fuel volume transferred into the fuel rail. The control is capable of substantially deactivating the pump. In some instances, pump noise can be masked by the noise from the internal combustion engine and/or road noise. For example, when a vehicle is being driven and when engine speed is greater than engine speed during idle conditions, pump noise can become indistinguishable from other engine and vehicle noise. As a result, injection pump noise is of little consequence during these conditions. On the other hand, when engine speed is near idle speed, injection pump noise can exceed engine noise such that fuel pump noise becomes audible and noticeable to a driver. Under these conditions, it can be desirable to deactivate the injection pump and supply fuel solely from the lift pump. When the injection pump is deactivated, fuel pressure created by the lift pump forces fuel through the injection pump and pressurizes the fuel rail located downstream of the injection pump. Pressure in the fuel rail approaches the pressure developed at the lift pump, minus pressure losses associated with pumping fuel through the injection pump and fuel lines. Based on the above conditions, and other conditions, it can be shown that it is desirable to have more than one pump mode for a two pump direct fuel injection system.

In one embodiment, fuel pump mode can be determined from the desired fuel rail pressure determined in step 303 and a desired fuel flow rate. In this embodiment, only the lift pump is operated if the lift pump pressure is sufficient to attain the required injection fuel flow rates. Both the lift pump and the injection pump are operated when an increased rail pressure needed to attain the desired fuel flow rates through the injectors. In another embodiment, fuel pump mode may be selected as a function of one or more parameters including but not limited to engine speed, engine load, ambient air temperature, and time since engine start. Mode selection may be facilitated by a state machine, logic, or other known methods. In this way, it is possible to produce different pump modes (i.e., lift pump active and injection pump deactivated or lift pump active and injection pump active) for different operating conditions. The routine proceeds to step 307 after the pump control mode is selected.

In step 307, the routine determines which control commands should be executed based on the selected pump mode. If a two pump mode has been selected, the routine proceeds to step 309. Otherwise, the routine proceeds to step 310.

In step 309, the injection pump is activated. An electric signal is sent from engine controller 12 to a pump modulation valve located in the injection pump. The modulation valve allows the injection pump to perform work on the fuel, thereby increasing pressure in the fuel rail.

In one embodiment, the increase in fuel rail pressure caused by reactivating the injection pump is anticipated or predicted by counting the number of fuel pump strokes after the injection pump is reactivated and the position of the modulation valve. In particular, the pressure observed in the fuel rail by the fuel rail pressure sensor is adjusted based on the pumped volume, the initial fuel rail pressure, and the fuel rail volume. The engine controller can then adjust the fuel injector timing based on the adjusted fuel pressure. This allows the engine controller to compensate fuel injector timing based on the fuel pressure increase that occurs when the injection pump is reactivated. After the pump is operated for a predetermined number of pump cycles, observed fuel rail pressure can be used to determine fuel injector timing without the need to adjust the observed fuel rail pressure.

The routine proceeds to step 311 after activating the injection pump.

In step 311, energy (e.g., current/voltage or torque) is delivered to the lift pump based on data stored in step 314. The energy can be varied as the operating conditions of the engine vary. For example, the energy supplied to the lift pump can be varied as engine speed and/or engine load vary. Alternatively, lift pump energy can be varied as the fuel delivery rate to the engine is varied. Also note that the energy may be adjusted to compensate for fuel or pump properties, which may be a function of fuel temperature. Fuel temperature may be measured or inferred. For example, when operating at lower temperatures pump current may be increased to compensate for increase lift pump friction, changes in fuel viscosity, and/or fuel vapor pressure. After the lift pump energy command is output the routine proceeds to step 313.

In step 313, the fuel rail pressure is determined. Fuel rail pressure is monitored downstream of the injection pump by pressure sensor 77. The sensor output voltage is converted into a pressure reference in controller 12. The observed fuel rail pressure can vary with engine speed and fuel flow rate. Engine control module 12 can adjust a signal to a modulating valve in the injection pump based on the pressure observed by sensor 77 to adjust the fuel rail pressure. In this way, pressure in the fuel rail can be closed-loop controlled. After determining fuel rail pressure, the routine proceeds to step 315.

In step 315, fuel injector timing is set and output. Fuel pressure determined in step 313, along with other parameters such as engine speed, engine load, and desired air-fuel ratio are used to determine fuel injection timing. Unique injection timings are output for each fuel injector so that the torque and air-fuel ratio of each cylinder can be individually controlled. The routine exits after outputting the determined fuel injection timings.

In step 310, the injection pump is substantially deactivated. That is, the injection pump efficiency is reduced such that the pump efficiency is below 10%. Single pump mode is typically active at lower engine speeds and loads. For example, the lift pump may remain active while the injection pump is deactivated during idle or during deceleration fuel cut-out conditions. This may lower powertrain noise and may also increase engine efficiency since high injection pressures may not be necessary under these conditions. After the pump is deactivated, the routine proceeds to step 312.

In step 312, fuel rail pressure is determined. Similar to step 313, fuel rail pressure is determined by converting the pressure sensor output voltage into units of pressure in the engine controller. The routine then proceeds to step 314.

In step 314, the lift pump energy is adjusted so that the pressure observed by pressure sensor 77 approaches a desired fuel rail pressure. The fuel sensor provides pressure feedback to the engine controller which in turn adjusts lift pump energy until a desired fuel rail pressure is achieved. The desired fuel rail pressure may be empirically determined or it may be determined based on injector flow characteristics. In one embodiment, the lift pump current/voltage may be feedback controlled using a proportional/integral (PI) controller, or another controller variant if desired. When the observed rail pressure (determined in step 312) substantially (e.g., ±1 bar) reaches the desired fuel rail pressure, the energy (e.g., current/voltage) command issued to the lift pump is stored into controller memory as the engine operates to correspond to the desired fuel rail pressure. In addition, the controller may also determine and store into memory, while the engine is operating or off, an intermediate fuel pressure (i.e., a fuel pressure between the lift pump outlet and the injection pump) by subtracting empirically determined data representing injection pump pressure losses and fuel line pressure losses from the measured rail pressure, if desired.

Stored fuel rail pressure measurement, intermediate fuel rail pressure inference, and supplied lift pump energy are used in open-loop pump control step 311. If desired, additional factors that may affect the fuel rail pressure that is developed by the lift pump may also be stored. These factors can be used to modify the energy command that is used to achieve a desired fuel rail pressure or lift pump pressure. In one embodiment, warmed-up engine operating conditions and an ambient temperature of 23° C. are considered nominal lift pump operating conditions over the single lift pump mode operating range. In this embodiment, current/voltage supplied to the lift pump as well as fuel rail pressure are stored under these operating conditions. The stored current/voltage can also be modified by factors that are a function of operating conditions (e.g., engine temperature and ambient air temperature) to determine open-loop lift pump parameters as operating conditions vary from nominal conditions.

After the supplied lift pump energy is adjusted and parameters are stored to memory, the routine proceeds to step 316.

In step 316, fuel injector timing is set and output. Fuel pressure determined in step 312, along with other parameters such as engine speed, engine load, and desired air-fuel ratio are used to determine fuel injection timing. Unique injection timings are output for each fuel injector so that the torque and air-fuel ratio of each cylinder can be individually controlled. The routine exits after outputting the determined fuel injection timings.

Figure 4:
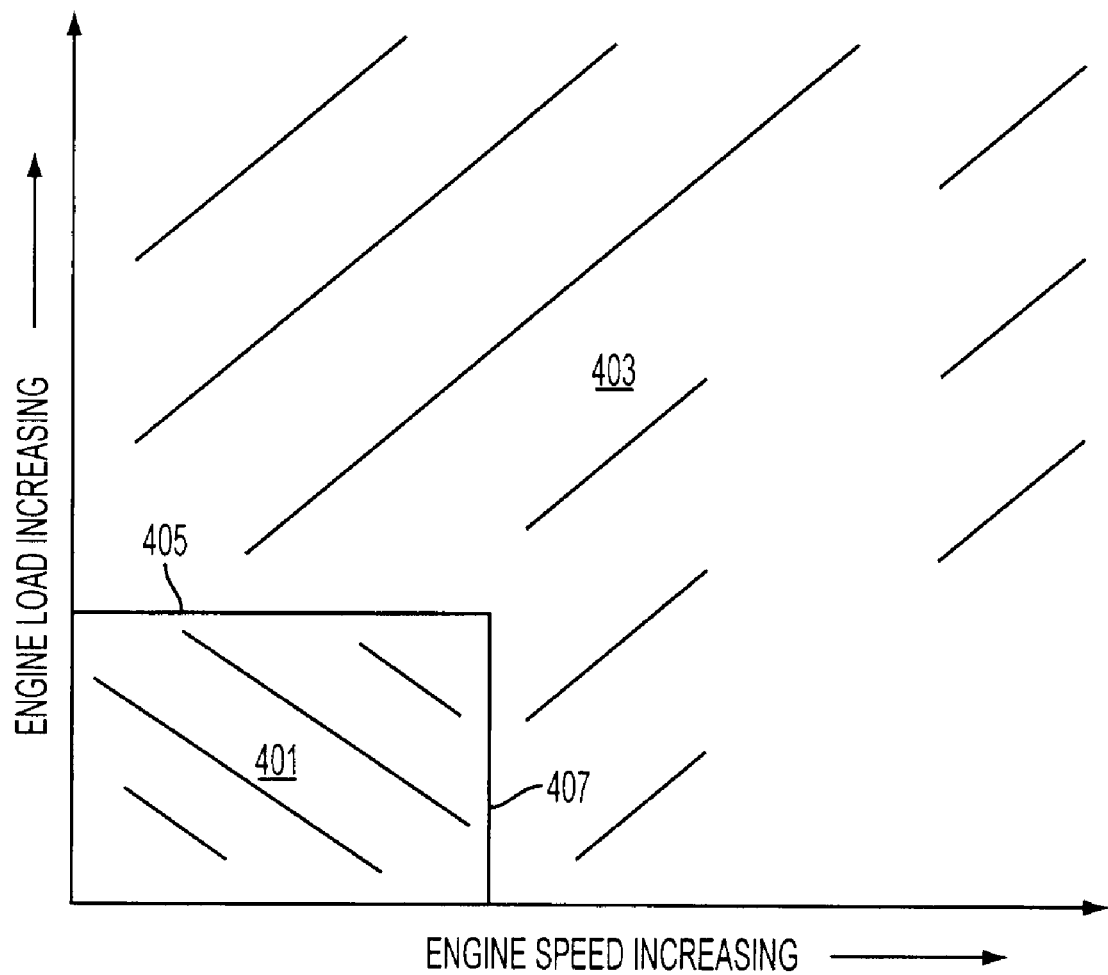
FIG. 4 is a schematic diagram of an example fuel pump operating mode map.

Referring now to FIG. 4, an example fuel pump control mode map is shown. The x-axis represents engine speed increasing from left to right. The y-axis represents increasing engine load from bottom to top. Region 401 (i.e., the area bounded by vertical line 407 and horizontal line 405) represents engine operating conditions when fuel is pumped to the engine by only the lift pump. That is, the injection pump is deactivated in this mode. As mentioned above, this mode can be useful when it is desirable to reduce the amount of noise generated by pumping fuel to the engine. Region 403 (i.e., the area above line 405 and to the right of line 407) represents engine operating conditions when fuel is pumped to the engine by two fuel pumps. Specifically, when a lift pump transfers fuel to the injection pump, and when the injection pump increases fuel pressure above the lift pump pressure. It should be noted that the boundaries represented by lines 405 and 407 may vary between different applications and are only exemplary in this figure. It should also be noted that there may be regions within region 401 where two pumps are used to supply fuel to the engine. In another embodiment, there may be more than one distinct single pump operating region. That is, there may be two or more regions where the lift pump supplies fuel to the engine while the injector pump is deactivated.

Referring now to FIG. 5, a plot of an example fuel pump operating map is shown. The x-axis represents fuel flow rate increasing from left to right. The y-axis represents fuel pressure at the pump outlet increasing from bottom to top. Each line (e.g., lines 501 and 503) represent the pump operating characteristics at a fixed voltage. Line represents pump output when the pump is supplied with 5 volts. Line 503 represents pump output when the pump is supplied with 13.5 volts. The lines in between lines 501 and 503 represent pump characteristics at when the pump is supplied different intermediate voltages. Notice that one fixed supply voltage is capable of supplying a range of pump outlet pressures and flow rates.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method to operate a lower pressure pump operating as part of a direct injection fuel system, the method comprising:
operating a lower pressure pump in a first mode during a first operating condition of an internal combustion engine, said lower pressure pump supplying fuel to a higher pressure pump that supplies fuel to fuel injectors that directly inject fuel to a cylinder, said first mode comprising adjusting energy supplied to said lower pressure pump as output from a sensor located downstream of said higher pressure pump varies while said higher pressure pump is substantially deactivated;
operating said lower pressure pump in a second mode during a second operating condition of said internal combustion engine, said second mode comprising varying energy supplied to said lower pressure pump as operating conditions of said internal combustion engine vary while said higher pressure pump is activated; and
applying an energy command learned while in said first mode to the lower pressure pump in said second mode.

2. The method of claim 1 wherein said energy is delivered as a voltage or current and wherein a pressure in a fuel rail supplied by said higher pressure pump is adjusted based on a pumped volume and a fuel rail volume.

3. The method of claim 1 wherein said sensor is a pressure sensor.

4. The method of claim 2 further comprising varying said current or voltage as operating conditions of said internal combustion engine vary and wherein a selection of said first mode is related to at least one of ambient air temperature and time since engine start.

5. The method of claim 1 wherein said higher pressure pump is substantially deactivated during said first mode at engine idle.

6. The method of claim 1 wherein operation in said first and second modes is determined from engine operating conditions.

7. The method of claim 2 wherein said higher pressure pump is driven by said internal combustion engine and wherein fuel injection timing is adjusted in response to the adjusted fuel rail pressure.

8. The method of claim 1 wherein said operating conditions of said internal combustion engine are comprised of at least one of a driver torque request, engine speed, engine load, ambient temperature, or engine temperature.

9. The method of claim 1 wherein said higher pressure pump is deactivated in conjunction with deceleration fuel cut-out during said first mode.

10. A method to operate a lift pump operating as part of a direct injection fuel system, the method comprising:
operating a lift pump in a first mode during a first operating condition of an internal combustion engine, said lift pump supplying fuel to an injection pump that supplies fuel to fuel injectors that directly inject fuel to a cylinder, said first mode comprising adjusting energy supplied to said lift pump as output from a sensor located downstream of said injection pump varies while said injection pump is deactivated;

storing a lift pump variable that corresponds to a pressure observed at said sensor as said engine operates in the first mode; and operating said lift pump in a second mode and adjusting an outlet pressure of said lift pump with said lift pump variable.

11. The method of claim 10 further comprising varying said energy in said first mode when operating conditions of said internal combustion engine vary.

12. The method of claim 10 further comprising operating said injection pump to increase the pressure of fuel delivered from said lift pump.

13. The method of claim 10 wherein said lift pump variable is an amount of current delivered to said lift pump and wherein a pressure in a fuel rail supplied by said higher pressure pump is adjusted based on a pumped volume and a fuel rail volume.

14. The method of claim 10 wherein said lift pump variable is an amount of voltage delivered to said lift pump.

15. The method of claim 13 wherein said lift pump variable is a lift pump temperature and wherein fuel injection timing is adjusted in response to the adjusted fuel rail pressure.

16. The method of claim 10 wherein said lift pump variable is stored in a function, array, or table that is indexed by lift pump operating conditions.

17. A method to operate lift and injection pumps that are part of a direct injection fuel system, the method comprising:

operating a lift pump in a first mode during a first operating condition of an internal combustion engine, said lift pump supplying fuel to an injection pump that supplies fuel to fuel injectors that directly inject fuel to a cylinder, said first mode comprising adjusting energy supplied to said lift pump as output from a sensor located downstream of said injection pump varies while said injection pump is deactivated;

operating said lift pump in a second mode during a second operating condition of said internal combustion engine, said second mode comprising varying energy supplied to said lift pump as operating conditions of said internal combustion engine vary while said injection pump is activated; and predicting fuel rail pressure during reactivation of said injection pump by counting a number of fuel pump strokes after reactivating said injection pump.

18. The method of claim 17 wherein said energy is delivered as a voltage or current.

19. The method of claim 17 wherein said injection pump is substantially deactivated during said first mode at engine idle.

20. The method of claim 17 wherein said injection pump is deactivated in conjunction with deceleration fuel cut-out.

* * * * *